Figures 1, 3:
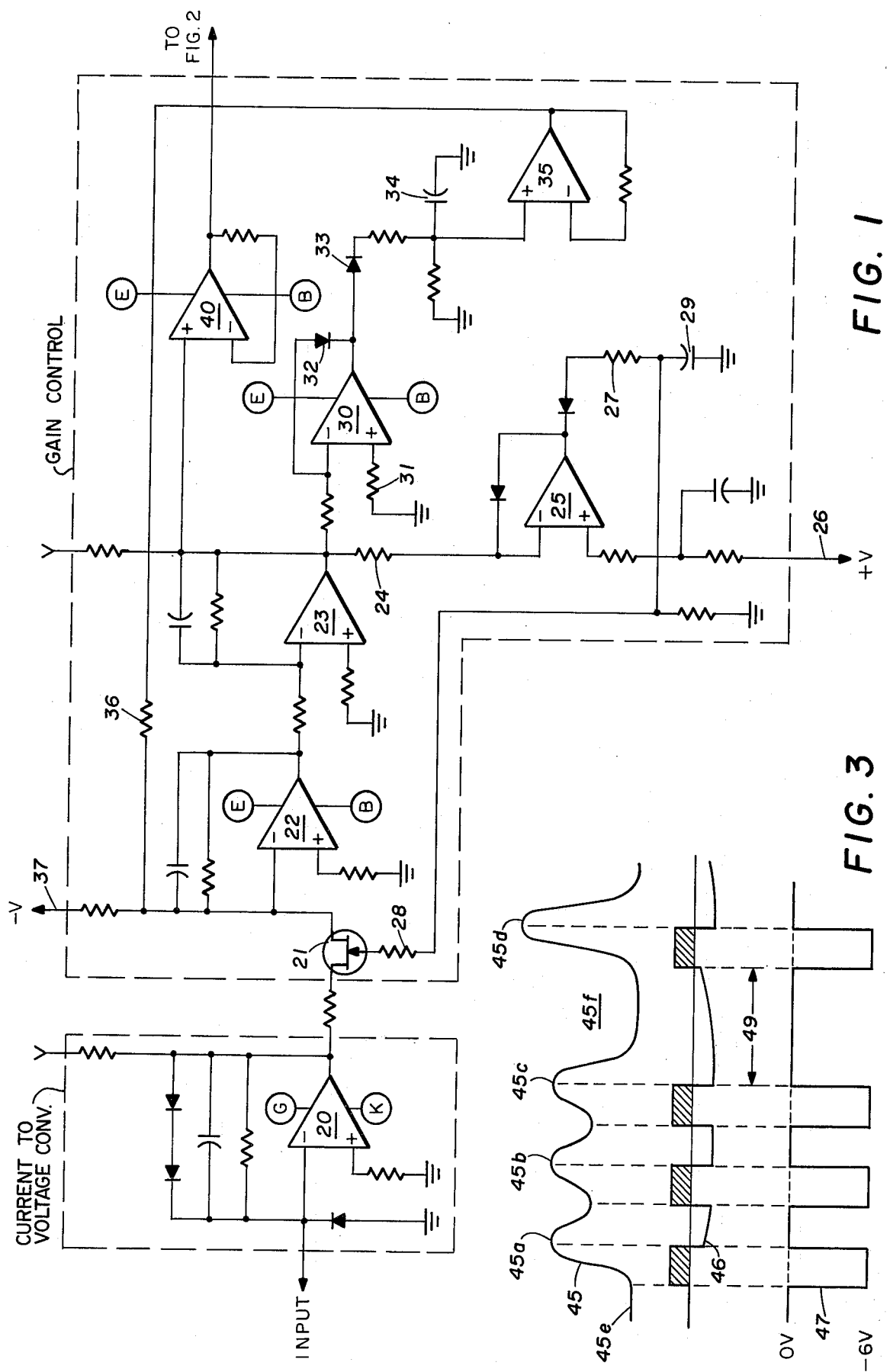

United States Patent [19]

McJohnson

[11] 3,969,612

[45] July 13, 1976

[54] BAR CODE READER ENHANCEMENT

[75] Inventor: Robert B. McJohnson, Dallas, Tex.

[73] Assignee: Recognition Equipment Incorporated, Irving, Tex.

[22] Filed: June 11, 1974

[21] Appl. No.: 478,238

[52] U.S. Cl. .......................... 235/61.11 E; 307/268; 328/150
[51] Int. Cl.² ..................... H03K 5/01; H03K 6/06; G06K 7/14
[58] Field of Search ................ 235/61.11 E, 61.6 E; 328/114, 115, 150, 151; 307/268, 261, 231; 178/69 D; 340/146.3 AG; 250/568, 569, 570

[56] References Cited
UNITED STATES PATENTS

| | | | |
|---|---|---|---|
| 3,538,444 | 11/1970 | Adlhoch | 328/150 |
| 3,631,263 | 12/1971 | Graham | 307/231 |
| 3,654,562 | 4/1972 | Reilly | 328/115 |
| 3,860,794 | 1/1975 | Knockeart | 307/261 |

Primary Examiner—Daryl W. Cook
Assistant Examiner—Robert M. Kilgore
Attorney, Agent, or Firm—Richards, Harris and Medlock

[57] ABSTRACT

Video signals generated by reading bar coded documents are transformed into pulses uniformly truncated in amplitude and having transitions only at points corresponding to change in sign of the slope of the adjusted video signals. The pulses are utilized to control the state of an output device depending upon whether the integral of any of the truncated pulses exceeds a reference level.

12 Claims, 3 Drawing Figures

BAR CODE READER ENHANCEMENT

This invention relates to bar code readers and more particularly to a method and system for treating signals from a bar code read head to eliminate extraneous features and to permit bar signals to be read in the presence of otherwise obliterating noise.

In processing financial documents as well as many other operations, data such as may be placed on a personal check is encoded in the bar code format of one face of the document. In subsequent operations involving the particular document the bar code is sensed and utilized. In many operations the bar code is optically sensed. Ideally, the presence of a bar would be indicated by one of two states and the absence of a bar would be indicated by the other of two states. Such documents normally are processed at a very high rate. Documents propelled past a read head cause a video output to be obtained which includes representations of the presence and absence of bars.

In practice, the optimum is seldom encountered. Banks in their operations stamp the back of the check at locations at which the bar code often appears. Bank stamps are in various colors and compositions of ink. The printing of bar codes over bank stamped legends renders reading of the bar code difficult. Bars may be overprinted by other materials. Noise is often introduced by impressions on the document having no relationship to the bar code. The documents encountered in handling transactions of various types are of widely different paper quality and color. Thus, the optical reader is faced with a difficult task of producing an output signal which may be readily processed to indicate the presence or absence of a bar.

In the past the output of the bar code reader has been applied directly to a level detector. Such detectors have been found incapable of accurately reproducing the bar code.

The present invention is directed to an improvement wherein not only level, but also frequency characteristics of the output of a reader are employed to increase accuracy.

The invention involves treating the video data to eliminate ambiguities therein, and to permit bars to be read in the presence of noise and significant changes in background. Where signals are produced by reading documents having bars encoded at uniform spacings and driven at uniform speed, a dynamic range of at least 8:1 is achieved as compared to the 3:1 dynamic range of prior systems. In such cases, frequency may be utilized in signal enhancement.

In accordance with the present invention, a video output signal from a bar code sensor is utilized to produce a video stream of pulses of uniform pulse height above a stabilized base line. Further, a square wave pulse train is generated having transitions synchronous with changes in the sign of the slope of the video stream. In addition, an integration output is produced which is responsive to the train and synchronized with the bar bit rate. A binary output voltage, having a logical state depending upon whether the integration output exceeds a preset reference level, is produced to indicate the presence or absence of bars.

In a more specific aspect, video signals derived from bar coded documents of varying reflectance, and having noise components in addition to signal components, are applied to a system in which a gain control means and a base line control means are utilized to produce a stream of pulses wherein the nominal bar height above a uniform base line is constant. Means are provided to transform the stream into pulses uniformly truncated in amplitude and having transitions only at points corresponding to changes in sign of the slope in the video stream. A bit synchronized means is then utilized to set an output state device depending upon whether the time integral of any of the truncated pulses exceeds a reference level.

Figure 2:
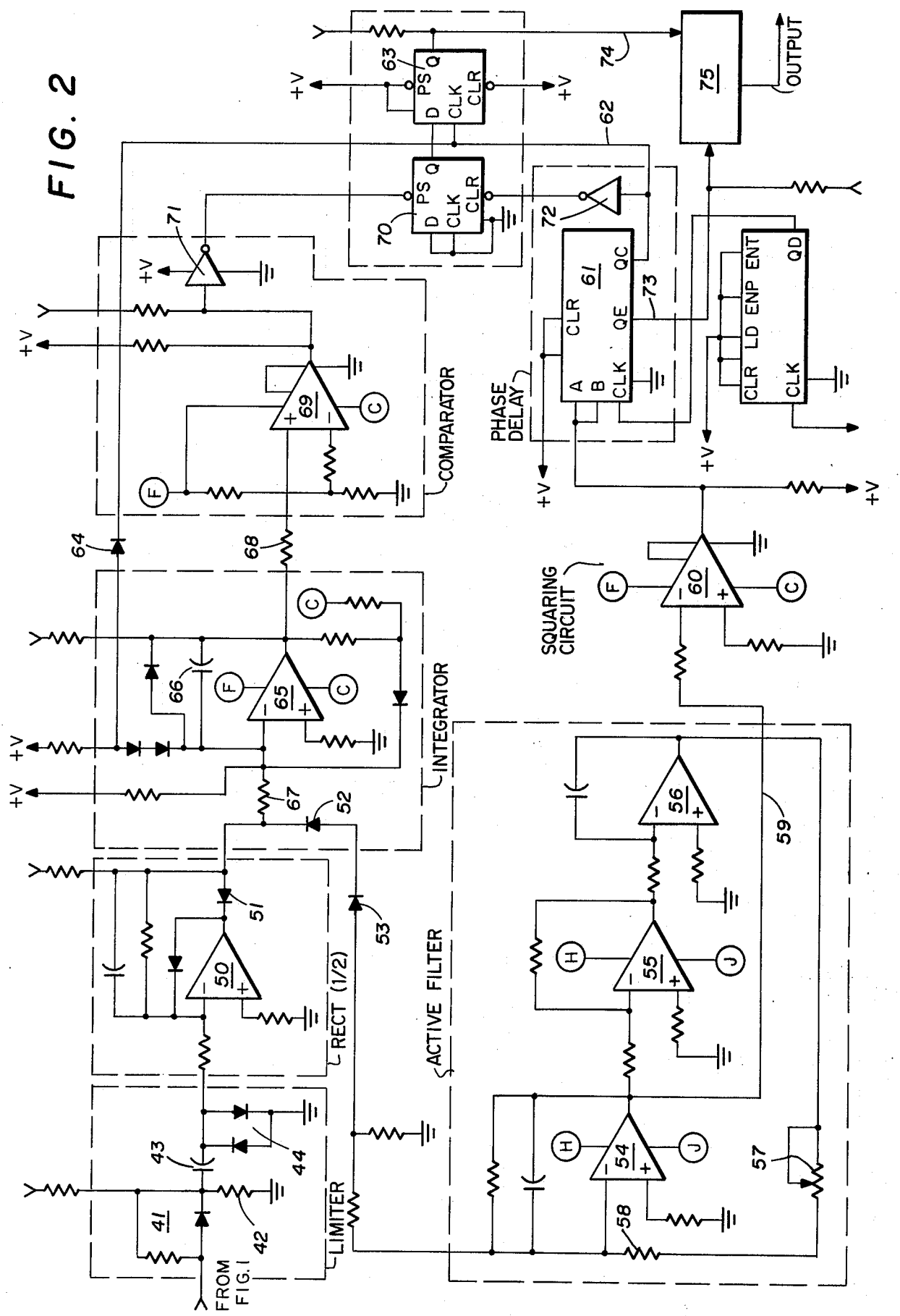

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIGS. 1 and 2 illustrate a preferred embodiment of the present invention is schematic form; and FIG. 3 illustrates wave forms involved in the operation of the system of FIGS. 1 and 2.

In FIG. 1, the output signal from a photomultiplier tube in an optical bar code reader is applied to an amplifier 20. Bars normally are printed at uniform spacing. The documents preferably are moved at uniform speed so that the frequency character of the output signal may have significance. The amplifier serves to convert the current output from the photomultiplier tube to a voltage. This voltage is then applied by way of an FET 21 to an amplifier 22 the operation of which is controlled through two feed back loops.

In the first loop the output of amplifier 22 is connected to an input of an amplifier 23, the output of which is connected through a resistor 24 to an input of a differential amplifier 25. The second input of amplifier 25 is supplied with a reference voltage (+5 volts) at terminal 26. The output of the amplifier 25 is then connected by way of resistors 27 and 28 to the gate of FET 21. The gate-source voltage of FET 21 is then varied to effectively control the gain of amplifier 22.

The foregoing portrays the gain control loop for amplifier 22.

A second loop is a base line loop. It is operated to maintain the lower level of the output of amplifier 22 at ground potential. This is done by connecting the output of amplifier 23 to one input of a differential amplifier 30. The second input of amplifier 30 is connected by way of resistor 31 to ground. A diode 32 is connected across amplifier 30 so that the amplifier 30 is responsive only to the negative excursions of the input voltage from amplifier 23 to produce through diode 33 a charge on capacitor 34. The charge on capacitor 34 is maintained until a new correction to the base line is to be made. The voltage across capacitor 34 is applied by way of amplifier 35 and resistor 36 to bias the input terminal of amplifier 22. It will be noted that negative bias voltage (−15 volts) is applied to amplifier 22 from terminal 37. This voltage normally maintains the output of amplifier 22 below ground potential. A positive voltage from capacitor 34 applied by way of resistor 36 serves to raise the level of the output of amplifier 22 back to ground level and maintain it at ground level.

This will be further understood by reference to FIG. 3. Bar coded signals read at a very high rate appear as a video signal to amplifier 22.

Such signals are illustrated by waveform 45 of FIG. 3. Output signals from the reader vary in response to the presence and absence of bars. Peaks 45a, 45b, 45c and 45d are produced in response to sensing of bars. Signals vary with respect to the base line 45e depending upon whether or not there is a series of bar codes adjacent one another, whether there are gaps as in the zone 45f or the nature of the background of the document. The second loop serves to minimize changes in the base line offset. The system operates such that for a variation in amplitude of the signal over a range of 7 to 1 at the output of amplifier 20, the signal at the output of the final amplifier 40 will remain constant.

The output of amplifier 40 is then applied to the input of a nonlinear voltage divider comprising the parallel resistor diode circuit 41 and resistor 42. The signal is then applied to a limiter circuit comprising capacitor 43 and the oppositely polled parallel connected diodes 44. The limiter circuit 43, 44 serves to clip the input voltage at the levels determined by the diodes 44 and causes a voltage transition at the output thereof at the instant of the change in slope of the input voltage. Thus, as shown in FIG. 3, where the video signal to the input of the limiter 44 is represented by waveform 45, the output is represented by the waveform 46. The signal represented by the waveform 46 appears at the input of amplifier 50 which is a half wave rectifying amplifier. Amplifier 50 then produces an output such as represented by the waveform 47 of FIG. 3. The latter signal is then applied from the output of amplifier 50, through diodes 51, 52 and 53 to the input of an active filter. The active filter comprises three amplifiers 54–56 connected in tandem. The output of amplifier 56 is connected by way of series resistors 57, 58 to the input of amplifier 54 so that the filter will ring at the bar rate to serve as a bit synchronizer. Thus, even though there are bits missing in the train as indicated in the zone 45f of FIG. 3, there will be a continuous train output from the filter as it appears on line 59. Line 59 is connected to one input of a comparator 60. The second input of amplifier 60 is connected to ground. Thus, the output of amplifier 60 will be representative of any filter output voltage from line 59 above or below ground potential. Amplifier 60 is a comparator that has a 0–5 volt output. The ringing signal from the active filter is squared at the output of amplifier 60, and is then applied to a shift register 61 to introduce a fixed time delay. The time delay involved is a fraction of a bit time and is used to compensate for phase delay introduced in the bit synchronizer.

A first output of the shift register 61 is connected by way of line 62 to a clock input terminal of an output flip-flop 63, and through diode 64 to the dump input terminal of an integrate and dump filter which is built around a differential amplifier 65. The integrate and dump filter is involved in the operation of amplifier 65. It serves as a low pass filter. The integrator circuit includes a capacitor 66 connected across the amplifier 65 and an input resistor 67. Capacitor 66 and resistor 67 determine the time constant of the integrator.

The output of the integrator-dump unit is applied by way of resistor 68 to the input of a comparator involving amplifier 69 which serves as a level detector. If the voltage from resistor 68 is above a given level, then the output causes the flip-flop 70 to be set. If the signal from resistor 68 is below a given level, then the flip-flop 70 will not be set. The output control signal is applied from amplifier 69 to flip-flop 70 by way of an inverter 71.

It will be noted that when the signal from flip-flop 70 is closed into flip-flop 63, then flip-flop 70 is reset by a signal from inverter 72.

Further, an output line 73 extends from register 61 to provide a strobe signal. The output of flip-flop 63 is connected by way of line 74 to the signal input of an output shift register 75. Line 73 is connected to the clock input of shift register 75. Shift register 75 thereby is provided a serial data stream fully representative of the information sensed by the photomultiplier system. Further, signal distortions caused by variations in the video background and by other noise sources are substantially reduced.

In one embodiment of the system, the following components were found to be satisfactory.

| | |
|---|---|
| amplifiers 20, 54, 55 | type 207 (National Semiconductor, Inc.) |
| amplifiers 22, 23, 30 25, 30, 40, 50, 55, 56 | type 1458 (Motorola, Inc.) |
| amplifier 60, 69 | type 311 (National Semiconductor, Inc.) |
| inverter 71 | type 74H04 (Texas Instruments, Inc.) |
| flip-flops 70, 63 | type 7474 (Texas Instruments, Inc.) |
| shift register 61 | type 74163 (Texas Instruments, Inc.) |
| resistor 27 | type 3.3k ohms |
| resistor 28 | type 10k ohms |
| capacitors 19, 34 | 1 microfarad |
| resistor 33 | 3.3k ohms |
| resistor 33a | 1 meg ohm |
| resistor 36 | 6.8k ohms |
| resistor 37 | 12k ohms |
| circuit 41 | 1.5k ohms and 1N915 diode |
| resistor 42 | 820 ohms |
| diodes | 1N914 |
| capacitor 66 | 110 picofarads |
| resistor 67 | 10k ohms |
| resistor 58 | 12k ohms |

Voltage sources B, K, J and C are isolated −15 volt sources. Voltage sources E, F, G and H are isolated +15 volt sources.

From the foregoing it will be seen that the invention modifies a video signal which is applied to the input to amplifier 20, and which possesses noise components in addition to signal components. The signal is applied to the circuit including units 22, 23, 30, 35 and 40 to produce a signal at the output of amplifier 40 having a uniform pulse height above a linear base. The limiter 44 and the rectifier including amplifier 50 transform the stream of pulses from amplifier 40 into uniformly truncated pulses, the transitions of which are synchronous with the changes in the sign of the slope of the amplifier 40 video stream. The active filter circuit including amplifiers 54, 55 and 56 is then caused to ring at the bit rate to synchronize the operation of the integrator involving amplifier 65 and a comparator involving amplifier 69. The output from the phase delay circuit of shift register 61 dumps the contents of the integrator including amplifier 65 at the bit rate. The comparator causes the output flip-flops to be set depending upon whether amplitude of the integral of any of the truncated pulses applied to the integrator of circuit 65 exceeds the reference level at the time of the dump signal from the register 61.

Having described the invention in connection with certain specific embodiments thereof, it is to be understood that further modifications may now suggest themselves to those skilled in the art, and it is intended to cover such modifications as fall within the scope of the appended claims.

What is claimed is:

1. Apparatus for processing a video signal derived from bar coded documents of varying reflectance, the video signals having noise components in addition to signal components, the combination comprising:
  means for transforming the video signal into amplitude truncated pulses having transitions at points corresponding to a change in the sign of the slope of the video signal,
  means for filtering the truncated pulses to produce a dump signal pulse train at a bit rate determined by transitions of the truncated pulses,
  means for integrating the truncated pulses and responsive to the dump signal to provide at the output thereof a pulse train at the integration level of the truncated pulses and synchronized at the bit rate,
  a threshold detector responsive to the output of said means for integrating to provide an output control signal when the integration level of the truncated pulses exceeds a preset level, and
  a bistable output means responsive to the output control signal to provide an output at one of two levels.

2. Apparatus for processing a video signal as set forth in claim 1 wherein said means for filtering includes active filter elements comprising a plurality of amplifier stages.

3. Apparatus for processing a video signal as set forth in claim 2, wherein said means for filtering further includes a squaring amplifier responsive to the output of the last amplifier stage to provide a square wave signal at the bit rate.

4. Apparatus for processing a video signal as set forth in claim 1 wherein said means for filtering further includes means for introducing a fixed time delay into the dump signal.

5. Apparatus for processing a video signal as set forth in claim 1 wherein said means for integrating includes an integrator amplifier and a dump filter responsive to the dump signal.

6. Apparatus for processing a video signal as set forth in claim 1 wherein said threshold detector includes a comparator amplifier having one input at the preset level and a second input responsive to the output of said means for integrating.

7. Apparatus for processing a video signal as set forth in claim 1 wherein said bistable output means includes a flip-flop that is set in accordance with the output control signal.

8. The combination set forth in claim 1 in which means are provided to deliver said signal to said means for processing with a substantially uniform base line.

9. In processing a video signal derived from bar coded documents of varying reflectance and having noise components in addition to signal components, the combination comprising:
  a. process means to transform said signal into pulses uniformly truncated in amplitude and having transitions only at points corresponding to change in sign of slope of said signal, and
  b. bit synchronized means to set or not set an output state device in dependence upon whether the integral of any of said truncated pulses exceeds or does not exceed a reference level, said bit synchronizing means including
    i. an integrating amplifier and an active filter to which said truncated pulses are simultaneously applied, said active filter being constructed to ring at the bit rate of the bar code components in said signal to produce a periodic dump signal,
    ii. means to apply said dump signal to said integrator at said bit rate, and
    iii. means at the output of said amplifier to compare the integral of said truncated pulses with a reference to set or not set said output state device.

10. The combination set forth in claim 9 in which phase delay means is connected between said active filter and said amplifier to correct for phase delay in said active filter and to synchronize said dump signal with operation of said integrator.

11. The combination set forth in claim 9 in which means are provided to deliver said signal to said process means with a substantially uniform base line.

12. The combination set forth in claim 9 wherein means are provided to deliver said signal to said process means while maintaining constant the nominal signal amplitude.

* * * * *